（12） United States Patent
Lazarus et al.

(10) Patent No.: US 9,886,683 B2
(45) Date of Patent: Feb. 6, 2018

(54) CALENDARING LOCATION-BASED EVENTS AND ASSOCIATED TRAVEL

(75) Inventors: Jonathan D. Lazarus, Mercer Island, WA (US); Ned Dykstra Hayes, Olympia, WA (US); Michael Perkowitz, Seattle, WA (US); Kevin Francis Eustice, Seattle, WA (US)

(73) Assignee: ARO, Inc., Seattle, WA (US)

( * ) Notice: Subject to any disclaimer, the term of this patent is extended or adjusted under 35 U.S.C. 154(b) by 584 days.

(21) Appl. No.: 12/624,682

(22) Filed: Nov. 24, 2009

(65) Prior Publication Data

US 2010/0175001 A1    Jul. 8, 2010

Related U.S. Application Data

(63) Continuation of application No. 12/568,354, filed on Sep. 28, 2009, now abandoned.

(60) Provisional application No. 61/142,875, filed on Jan. 6, 2009.

(51) Int. Cl.
*G06Q 10/10* (2012.01)

(52) U.S. Cl.
CPC .................................. *G06Q 10/109* (2013.01)

(58) Field of Classification Search
USPC ......................................................... 715/753
See application file for complete search history.

(56) References Cited

U.S. PATENT DOCUMENTS

| 5,345,551 | A  | 9/1994  | Shelley et al. |
| 6,366,922 | B1 | 4/2002  | Althoff |
| 6,370,554 | B1 | 4/2002  | Sun-Woo |
| 6,816,863 | B2 | 11/2004 | Bates et al. |
| 6,985,926 | B1 | 1/2006  | Ferlauto et al. |
| 7,069,228 | B1 | 6/2006  | Rose et al. |
| 7,249,123 | B2 | 7/2007  | Elder et al. |
| 7,428,579 | B2 | 9/2008  | Libbey et al. |
| 7,525,484 | B2 * | 4/2009 | Dupray et al. ................ 342/450 |

(Continued)

OTHER PUBLICATIONS

Information Technology Services, College of Architecture, Texas A&M University, "How to Schedule Rooms in Microsoft Entourage," 2009 [Online] [Retrieved Jul. 29, 2010] Retrieved from the Internet ,<URL: http://its.arch.tamu.edu/content/support/documentation/mail/entourage/entourage-room-scheduling>.

(Continued)

*Primary Examiner* — Haimei Jiang
(74) *Attorney, Agent, or Firm* — Davis Wright Tremaine LLP

(57) ABSTRACT

A user interface for an electronic calendar represents different locations or different users or different user calendars in different portions of the display. Calendar entries can be associated with one or more locations, one or more users, and with one or more user calendars. The different locations may reside in different time zones and a timeline for each time zone is displayed. The position of the calendar entry provides a visual identifier of the timeline with which the event is associated. Travel time to and from events in the calendar are calculated for calendared events and shown adjacent to the beginning and end of the event. A user's future location at a point in time is inferred from patterns in the user's locations and by analyzing the user's calendared events and correspondence in order to calculate travel time to calendared events.

20 Claims, 9 Drawing Sheets

(56) References Cited

U.S. PATENT DOCUMENTS

| | | | |
|---|---|---|---|
| 7,565,403 B2 | 7/2009 | Horvitz et al. | |
| 7,634,528 B2 | 12/2009 | Horvitz et al. | |
| 7,636,733 B1 | 12/2009 | Rothmuller | |
| 7,689,448 B2 | 3/2010 | Fu et al. | |
| 7,721,229 B2 | 5/2010 | Frankel et al. | |
| 7,885,948 B2 | 2/2011 | Johnson et al. | |
| 7,890,596 B2 | 2/2011 | Guy | |
| 7,984,006 B2 * | 7/2011 | Price | G06Q 30/02 706/46 |
| 8,108,778 B2 * | 1/2012 | Athsani et al. | 715/738 |
| 8,594,702 B2 * | 11/2013 | Naaman et al. | 455/456.2 |
| 8,694,540 B1 * | 4/2014 | Lin et al. | 707/777 |
| 2002/0038234 A1 * | 3/2002 | Fu et al. | 705/8 |
| 2003/0140088 A1 * | 7/2003 | Robinson | G06Q 10/10 709/202 |
| 2003/0193481 A1 | 10/2003 | Sokolsky | |
| 2005/0057584 A1 | 3/2005 | Gruen et al. | |
| 2005/0261011 A1 | 11/2005 | Scott | |
| 2005/0267944 A1 | 12/2005 | Little | |
| 2006/0068812 A1 * | 3/2006 | Carro | H04M 1/72566 455/456.3 |
| 2006/0069503 A1 * | 3/2006 | Suomela | G01C 21/3641 701/431 |
| 2006/0112146 A1 | 5/2006 | Song et al. | |
| 2006/0121912 A1 * | 6/2006 | Borjesson | 455/456.1 |
| 2006/0173957 A1 | 8/2006 | Robinson et al. | |
| 2006/0184617 A1 * | 8/2006 | Nicholas et al. | 709/203 |
| 2006/0195533 A1 | 8/2006 | Isozaki et al. | |
| 2006/0235873 A1 | 10/2006 | Thomas | |
| 2006/0293943 A1 | 12/2006 | Tischhauser et al. | |
| 2006/0294134 A1 | 12/2006 | Berkhim et al. | |
| 2007/0005654 A1 | 1/2007 | Schachar et al. | |
| 2007/0011236 A1 | 1/2007 | Ravula | |
| 2007/0214180 A1 | 9/2007 | Crawford | |
| 2007/0271272 A1 | 11/2007 | McGuire et al. | |
| 2007/0298812 A1 * | 12/2007 | Singh | H04L 29/12122 455/456.1 |
| 2008/0005249 A1 | 1/2008 | Hart | |
| 2008/0012960 A1 * | 1/2008 | Uchiyama | 348/231.2 |
| 2008/0059576 A1 | 3/2008 | Liu et al. | |
| 2008/0064438 A1 * | 3/2008 | Calvet | H04N 1/00244 455/556.1 |
| 2008/0104005 A1 * | 5/2008 | Dalton | 706/45 |
| 2008/0109718 A1 * | 5/2008 | Narayanaswami | G06Q 10/109 715/262 |
| 2008/0109751 A1 | 5/2008 | Fitzmaurice et al. | |
| 2008/0134088 A1 * | 6/2008 | Tse | G06F 17/30241 715/810 |
| 2008/0141145 A1 | 6/2008 | Klausmeier | |
| 2008/0147310 A1 * | 6/2008 | Mok | G01C 21/20 701/434 |
| 2008/0167938 A1 * | 7/2008 | Meisels et al. | 705/9 |
| 2008/0228947 A1 | 9/2008 | Markus et al. | |
| 2008/0301567 A1 * | 12/2008 | Martin et al. | 715/751 |
| 2009/0006994 A1 * | 1/2009 | Forstall et al. | 715/764 |
| 2009/0037813 A1 | 2/2009 | Newman et al. | |
| 2009/0037822 A1 * | 2/2009 | Kandekar et al. | 715/733 |
| 2009/0055355 A1 | 2/2009 | Brunner et al. | |
| 2009/0094021 A1 | 4/2009 | Marvit et al. | |
| 2009/0102712 A1 * | 4/2009 | Heffez | G06Q 20/32 342/357.55 |
| 2009/0112525 A1 * | 4/2009 | Adani | 702/189 |
| 2009/0171937 A1 | 7/2009 | Chen et al. | |
| 2009/0187537 A1 | 7/2009 | Yachin et al. | |
| 2009/0281718 A1 * | 11/2009 | Gibran et al. | 701/200 |
| 2009/0327307 A1 * | 12/2009 | Sun et al. | 707/10 |
| 2010/0050101 A1 * | 2/2010 | Baik et al. | 715/764 |
| 2010/0070297 A1 | 3/2010 | Tavakol et al. | |
| 2010/0070894 A1 | 3/2010 | Krishnamurthy et al. | |
| 2010/0074560 A1 * | 3/2010 | Wagner et al. | 382/309 |
| 2010/0082624 A1 * | 4/2010 | Martin et al. | 707/737 |
| 2010/0131443 A1 * | 5/2010 | Agarwal et al. | 706/46 |
| 2010/0162105 A1 * | 6/2010 | Beebe et al. | 715/273 |
| 2011/0093340 A1 * | 4/2011 | Kramer | G06Q 30/0261 705/14.58 |
| 2011/0137929 A1 * | 6/2011 | Lehmann et al. | 707/769 |

OTHER PUBLICATIONS

Microsoft Corporation, "Work with Time Zones in Outlook," 2010 [Online] [Retrieved on Jul. 29, 2010] Retrieved from the Internet, <URL:http://office.microsoft.com/en-us/outlook-help/work-with-time-zones-in-outlook-HA001056530.aspx.>.

PCT International Search Report and Written Opinion, PCT Application No. PCT/US2010/020134, dated May 19, 2010, 7 pages.

PCT International Search Report and Written Opinion, PCT Application No. PCT/US2009/052313, dated Sep. 3, 2009, 7 pages.

PCT International Search Report and Written Opinion, PCT Application No. PCT/US2009/052311, dated Sep. 15, 2009, 6 pages.

United States Patent and Trademark Office, Final Rejection, U.S. Appl. No. 12/512,752, dated Sep. 13, 2012, 51 pages.

Hirsch, J.E., "An index to quantify an individual's scientific research output," *Proceedings of the National Academy of Sciences of the USA*, Nov. 15, 2005, pp. 16569-16572, vol. 102, No. 46.

Lehmann, S. et al., "A quantitative analysis of indicators of scientific performance," *Scientometrics*, 2008, pp. 369-390, vol. 76, No. 2.

Rijnsoever, F. et al., "A resource-based view on the interactions of university researches," *Research Policy*, 2008, pp. 1255-1266, vol. 37.

United States Office Action, U.S. Appl. No. 12/512,752, dated Aug. 30, 2013, fifty-four pages.

Aleman-Meza, B. et al., "Semantics Analytics on Social Networks: Experiences in Addressing the Problem of Conflict of Interest Detection," *Proceedings of the 15th International Conference on the World Wide Web*, May 23-26, 2006, pp. 407-418, Edinburgh, Scotland.

Boyd, D., "FacetedID/Entity: Managing representation in a digital world," Master of Science Thesis for Master of Science in Media Arts and Sciences, Massachusetts Institute of Technology, 2002, one hundred eighteen pages.

United States Office Action, U.S. Appl. No. 12/512,752, dated Apr. 28, 2014, fifty-five pages.

Viegas, F. et al., "Digital Artifacts for Remembering and Storytelling: *PostHistory and Socital Network Fragments*," *Proceedings of the 37th Hawaii International Conference on System Sciences*, 2004, ten pages.

Gloor, P. et al., "Analyzing Actors and Their Discussion Topics by Semantic Social Network Analysis," *Proceedings of the Information Visualization (IV'06)*, 2006, six pages.

Tang, J. et al., "Social Network Extraction of Academic Researchers," *Seventh IEEE International Conference on Data Mining*, 2007, pp. 292-301.

* cited by examiner

US 9,886,683 B2

CALENDARING LOCATION-BASED EVENTS AND ASSOCIATED TRAVEL

CROSS-REFERENCE TO RELATED APPLICATION

This application is a continuation of U.S. application Ser. No. 12/568,354 filed on Sep. 28, 2009, which claims the benefit of U.S. Provisional Patent Application No. 61/142,875, filed Jan. 6, 2009, which is hereby incorporated by reference in its entirety. This application is related to U.S. patent application Ser. No. 12/512,854, filed Jul. 30, 2009, entitled "Data-Oriented User Interface for Mobile Device," and U.S. patent application Ser. No. 12/512,752, filed Jul. 30, 2009, entitled "Social Network Model for Semantic Processing" which are incorporated by reference in their entirety.

BACKGROUND

1. Field of the Invention

The present invention relates to electronic calendars.

2. Description of the Related Art

Users commonly maintain electronic calendars in order to track scheduled appointments, organize meetings, provide reminders to attend planned events, and for the convenience of sharing their availability with others through allowing others to view the electronic calendar. Although electronic calendars are convenient for helping users avoid being double-booked for activities occurring at the same time, conventional electronic calendars do not adequately account for implicit conflicts created by the locations of various meetings. For example, scheduling two adjacent meetings or events that occur in different places may not allow enough time to travel between the events.

To address the travel time issue, users have developed a variety of approaches, each with respective drawbacks. First, users may choose not to show travel times between events on their calendar. Drawbacks of this approach include the risk of forgetting about or wrongly estimating the travel time required to arrive at an event and leaving too late. Also, other users viewing the calendar may attempt to schedule a meeting with the user for the slot that was intended by the user for travel to another meeting because the slot appeared to be free.

Second, users may extend the existing meeting to account for the travel time needed to and from the meeting. Drawbacks of this approach include the risk that the user may incorrectly estimate the travel time, and/or forget the actual start time of the meeting. Also, should the meeting be rescheduled, the user must perform the same estimations and extension again. This approach also hinders the user's ability to invite others to the meeting, since the meeting period reflects the user's own travel times and the travel times may vary for others travelling from different locations.

Another approach involves the user manually entering an appointment immediately before and an appointment immediately after any meeting that requires travel in order to block off an estimated travel period on the electronic calendar. This approach is cumbersome for those who travel frequently as any meeting that requires travel becomes a requirement to create three calendar entries that each must be moved if the meeting is rescheduled. This approach also still suffers from the drawback mentioned above regarding the risk that the user may incorrectly estimate the travel time.

SUMMARY

Embodiments of the invention provide methods, systems, and computer program products for an electronic calendar that recognizes events on the calendar occur at locations and accounts for travel between the locations for the calendared events. In one embodiment, a user interface for the electronic calendar represents different locations in different portions of the display. Calendar entries, such as a conference call or a plane flight, can be associated with one or more location, such as the locations of all conference call participants or the departure and arrival cities for the flight. In one particular embodiment, the different locations reside in different time zones and a timeline for each time zone is displayed. The position of the calendar entries provides a visual identifier to the user of the timeline with which the event is associated.

In another embodiment, travel time to and/or from events in the calendar are calculated for calendared events. The time estimated for travel to an event can be shown adjacent to the beginning of the event and the time estimated for travel from the event can be shown adjacent to the end of the event.

In another embodiment, a user's future location at a point in time is inferred from observing patterns in the user's activities and locations as well as by analyzing the user's calendared events and correspondence. By inferring where a user is likely to be traveling from in order to arrive at an event, an estimate can be made as to the appropriate amount of time to allot in the calendar for travel to the event. By inferring where a user is likely to be traveling after an event, an estimate can be made as to the appropriate amount of time to allot for travel after a calendared event.

One skilled in the art will readily recognize from the following discussion that alternative embodiments of the structures and methods illustrated herein may be employed without departing from the principles of the invention described herein.

DETAILED DESCRIPTION OF THE EMBODIMENTS

Embodiments of the invention provide methods, systems, and computer program products for an electronic calendar that recognizes events on the calendar occur at locations and accounts for time needed to travel between the locations for the calendared events. The electronic calendar may be accessed through an application on a mobile device such as a "smart phone" or a laptop that is equipped with GPS or other location determination technology. Thus, as the user carries the device from place to place throughout the day, the user can access the user's calendar and the device can track the user's location. Through recognizing patterns in the user's locations and from analyzing the user's calendared events and the user's correspondence, the user's future location can be inferred, thus enabling estimates of travel times to events on the calendar from the user's likely starting location and estimates of travel times from events on the calendar to the user's likely next destination.

Figure 1:
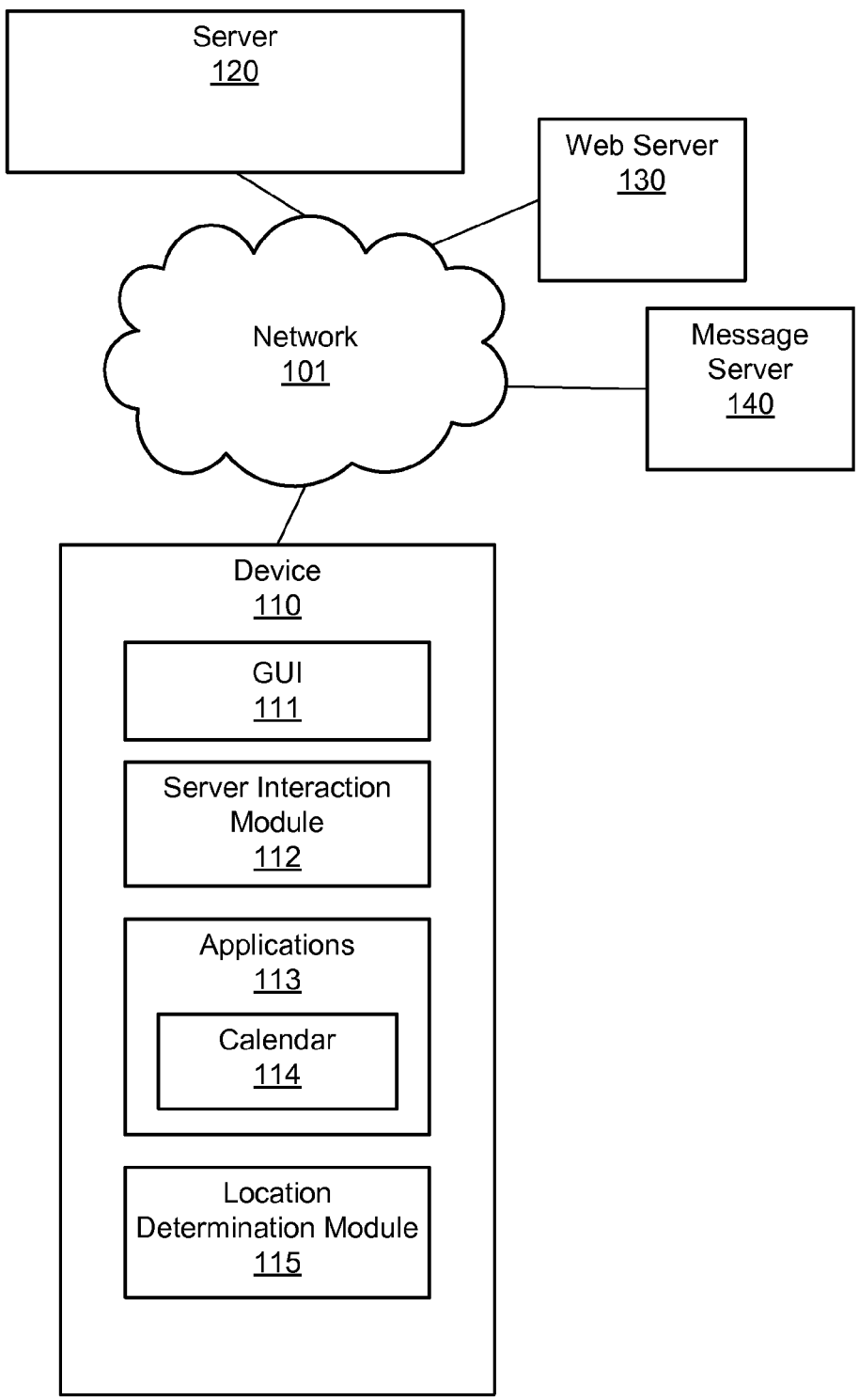
FIG. 1 is a high-level block diagram of the computing environment, in accordance with an embodiment of the invention.

FIG. 1 is a high-level block diagram of the computing environment 100 in accordance with an embodiment of the invention. The computing environment 100 includes a server 120 that is connected via a network 101 to a user device 110. The network 101 is a communications network such as a local area network, a wide area network, a wireless network, an intranet, or the Internet. In one embodiment, the computing environment 100 also includes a web server 130 that serves web pages to the user device 110 and a message server 140 that serves messages such as email or SMS messages to the user device 110. Although only one user device 110 and a limited number of servers are shown in FIG. 1 for clarity, any number and type of user devices and server configurations may be connected to the network 101.

In one embodiment, data flowing to and from the user device 110 passes through the server 120. For ease of reference, the term "document" will be used herein to refer to a discrete collection of data, such as an appointment request, an email, a web page, a message, a file, or any other type of electronic document. The term "correspondence" will be used herein to refer to any document that contains a message sent by the user or received by the user, such as an email, a text-message, an appointment request, or the like. The server 120 analyzes the documents flowing to and from the user device 110 in order to extract entities from the data and to recognize events. Entities are data objects that represent people, organizations, locations, or other real world items. Entities have properties associated with them, such as aliases, addresses, latitude/longitude coordinates, points of contact for the entity, and the like. The server 120 extracts the entities from the documents and passes the entity information to the user device 110 so that the user device 110 can offer to the user contextually-relevant actions with respect to the entities, as described by U.S. patent application Ser. No. 12/512,854, filed Jul. 30, 2009, entitled "Data-Oriented User Interface for Mobile Device," which has been incorporated herein. The server 120 also extracts event information from an analysis of the user's correspondence for use in adding to calendar entries. The server 120 also tracks the user's location from location information received from the user device and can infer the user's future location at various times based on patterns in the tracked locations, the user's calendared events, and the user's analyzed correspondence.

In various embodiments, the user device 110 may be any device capable of communicating over the network 101. Examples of a user device 110 include a personal digital assistant (PDA), a mobile device with limited functionality or a "smart phone" mobile device that offers broad functionality such as large memory storage and an advanced user interface, and any portable computer. In one embodiment, the user device 110 is a "smart phone" device that offers broad functionality. For example, the device may track calendar appointments, provide GPS or other location determination functionality, send and receive SMS messages and email, offer web access, manage contact information, and manage and communicate other types of documents.

The user device 110 has a graphical user interface 111 that allows a user to access and interact with data stored on the user device to make use of the device's functionality. The graphical user interface 111 allows users to view information and select information, for example, by clicking on it, touching it, highlighting it with a cursor, or any other method of selecting a portion of the displayed information. The graphical user interface 111 can be used to display and edit the user's calendar and details about the calendar entries. Examples of the user interface 111 are described below with reference to FIGS. 4-7. In one embodiment, the graphical user interface 111 also includes node menus that contain actions relevant to a selected entity and/or spinners which allow a user to simultaneously view information from a variety of applications that is relevant to an entity, both of which have been described in U.S. patent application Ser. No. 12/512,854, filed Jul. 30, 2009, entitled "Data-Oriented User Interface for Mobile Device," which has been incorporated by reference in its entirety.

In this example, in addition to the graphical user interface 111, the user device 110 includes various applications 113 that support the functionality of the user device 110. For example, the user device 110 may include a calendar application 114 and telephone, email, contact manager, browser, word processing, map browser, spreadsheet, and/or other business or personal applications. A user of the user device 110 may create, receive, send, access, store, or otherwise interact with data through the applications 113. Specifically, the user can use the calendar application 114 to schedule, view and update calendar entries, and send meeting requests to others. As will be described in more detail below, the calendar application 114 recognizes that some events are tied to specific locations and the electronic calendar represents different locations in different portions of the display. Calendar entries, such as a conference call or a plane flight, can be associated with one or more locations, such as the locations of all conference call participants or the departure and arrival cities for the flight. In one particular embodiment, the different locations may reside in different time zones, and the calendar application 114 displays the relative local time for calendar entries in association with the calendar entries.

The user device 110 also includes a location determination module 115. The location determination module 115 determines the current location of the user device 110, for example from received GPS and/or cellular signals and/or any other location determination method known to those of skill in the art. In one embodiment, the location determination module 115 determines the location of the user device in terms of latitude and longitude.

The user device 110 also includes a server interaction module 112 to manage the communications between the server 120 and the user device 110. Specifically, the server interaction module 112 receives data sent to the user device 110 from the server 120, including, in one embodiment, metadata identifying extracted entities within the data and recognized events. The server interaction module 112 also receives data to be sent to the server 120 from the user device 110, for example outbound email and text messages and the determined location of the user device 110 from the location determination module 115.

Figure 2A:
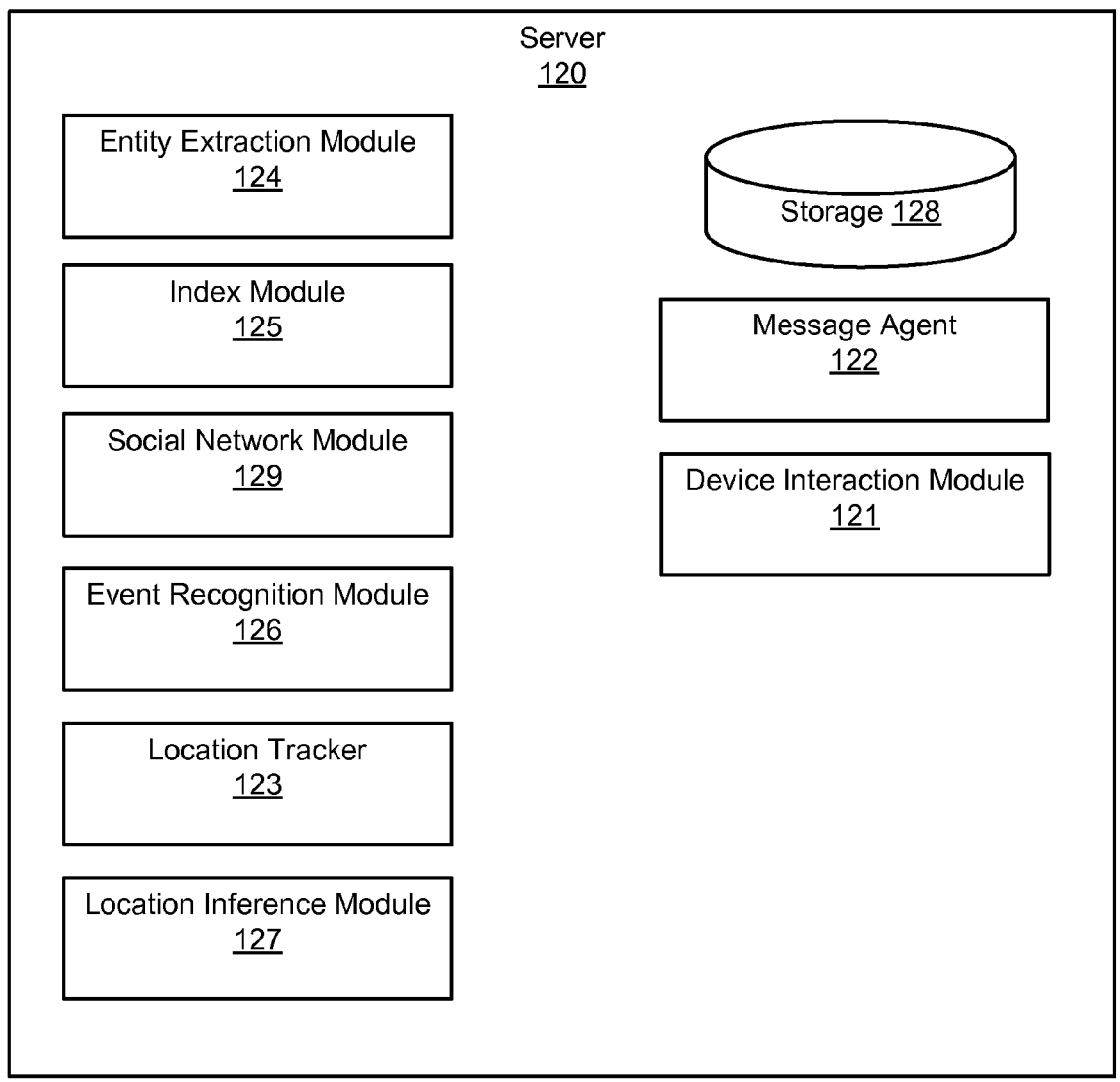
FIG. 2A is a block diagram of a server, in accordance with an embodiment of the invention.

FIG. 2A is a block diagram of a server 120, in accordance with an embodiment of the invention. The server 120 analyzes data flowing to and from the user device 110 in order to extract entities and recognize events. In this example, the server 120 includes an entity extraction module 124, an index module 125, a social network module 129, an event recognition module 126, a location tracker 123, a location inference module 127, a storage module 128, a message agent 122, and a device interaction module 121.

The entity extraction module 124 identifies entities from data flowing to and from the user device 110. The entity extraction module 124 parses text in a document in order to identify entities. For example, location names, names of people, and names of organizations are extracted based on full natural language processing, whereas phone numbers, email addresses, and URLs are extracted based on regular expressions, and dates and times are extracted based on a set of rules. In one embodiment, the entity name may be an alias of the word or words that appear in the text that undergoes analysis by the entity extraction module 124. In one embodiment, the entity type is one of person, organization, location, or other. The entity name and type may be output from the entity extraction module to storage 128 and/or communicated to the user device 110 through the device interaction module 121 of the server 120.

The index module 125 indexes the data according to the entities extracted by the entity extraction module 124, in one embodiment. In cases where a document contains more than one extracted entity, the document may be indexed under each extracted entity. The index module 125 may store the results of the indexing in a local storage 128 or remote storage (not shown).

The social network module 129 builds the social network model implicit in the user's data, such as from contacts, email, web pages, as well as other types of documents. The social network model is a description of the relationships between the entities that are found in the user's data. The social network model adjusts the strength of relationships determined to exist between entities, particularly people entities. The server 120 uses the user's social network model, for example, to aid in entity extraction and to aid in identifying entities from an ambiguous reference in the user's data, as described in U.S. patent application Ser. No. 12/512,752, filed Jul. 30, 2009, entitled "Social network Model for Semantic Processing" which has been incorporated by reference. The social network module 129 stores the social network model in storage 128.

The message agent 122 receives inbound messages from message server 140 and outbound messages from the user device 110. The message agent 122 may also act as a mail transfer agent in routing messages between servers and mail clients. The message agent 122 provides the server 120 with the ability to intercept and process messages passing between devices on the network 101.

The event recognition module 126 recognizes events from data flowing to and from the user device 110, including the user's correspondence. The event recognition module 126 parses text in a document in order to identify appointments, meeting requests, flight reservations, and itineraries. A variety of techniques can be used to recognize events and extract event information from the parsed text. In one embodiment, a machine learning algorithm uses features such as the presence of date, time, location, people and other entities, and the presence of phrases such as "meet", "get together", and the like to learn a model for recognizing when a document refers to an event. The event information may comprise a time period, one or more locations, and one or more participants. The event information may be output from the event recognition module 126 to storage 128 and/or communicated to the user device 110 through the device interaction module 121 of the server as metadata associated with the document. In one embodiment, when the user views a document with associated event metadata, the user interface provides a mechanism to create a new event in the calendar using the associated metadata. In one embodiment, entities related to the event are highlighted; when the user selects a highlighted entity, a node menu appears including an option to create a new event incorporating the metadata. Node menus are discussed in more detail in U.S. patent application Ser. No. 12/512,854, filed Jul. 30, 2009, entitled "Data-Oriented User Interface for Mobile Device," which has been incorporated herein by reference.

The location tracker 123 receives information regarding the location of the user device 110 from the location determination module 115 of the user device 110. For example, the location tracker 123 may receive a stream of coordinates derived from GPS signals or from cellular or other location determination technologies. In one embodiment, the location of the user's device 110 is tracked every 10 minutes. In other embodiments, the location may be tracked more or less frequently. Generally, a higher frequency of location determinations results in more accurate location data but a shorter battery life for the device 110. The location tracker 123 may store the user's location data in storage 128.

The location inference module 127 infers the future location of the user based on prior patterns, the user's calendared events, and the user's correspondence. The location inference module 127 is described in greater detail with reference to FIG. 2B.

The device interaction module 121 manages the communications between the server 120 and the user device 110. Specifically, the device interaction module 121 receives documents from, for example, web server 130 or message server 140 through message agent 122, or from other locations on the network 101, to be sent to a user device 110. In one embodiment, the device interaction module 121 also receives metadata identifying entities within documents from the entity extraction module 124 and event information from event recognition module 126. The device interaction module 121 also receives data from the user device 110 for subsequent processing by the server 120, including the location information from the location determination module 115 of the user device 110.

Figure 2B:
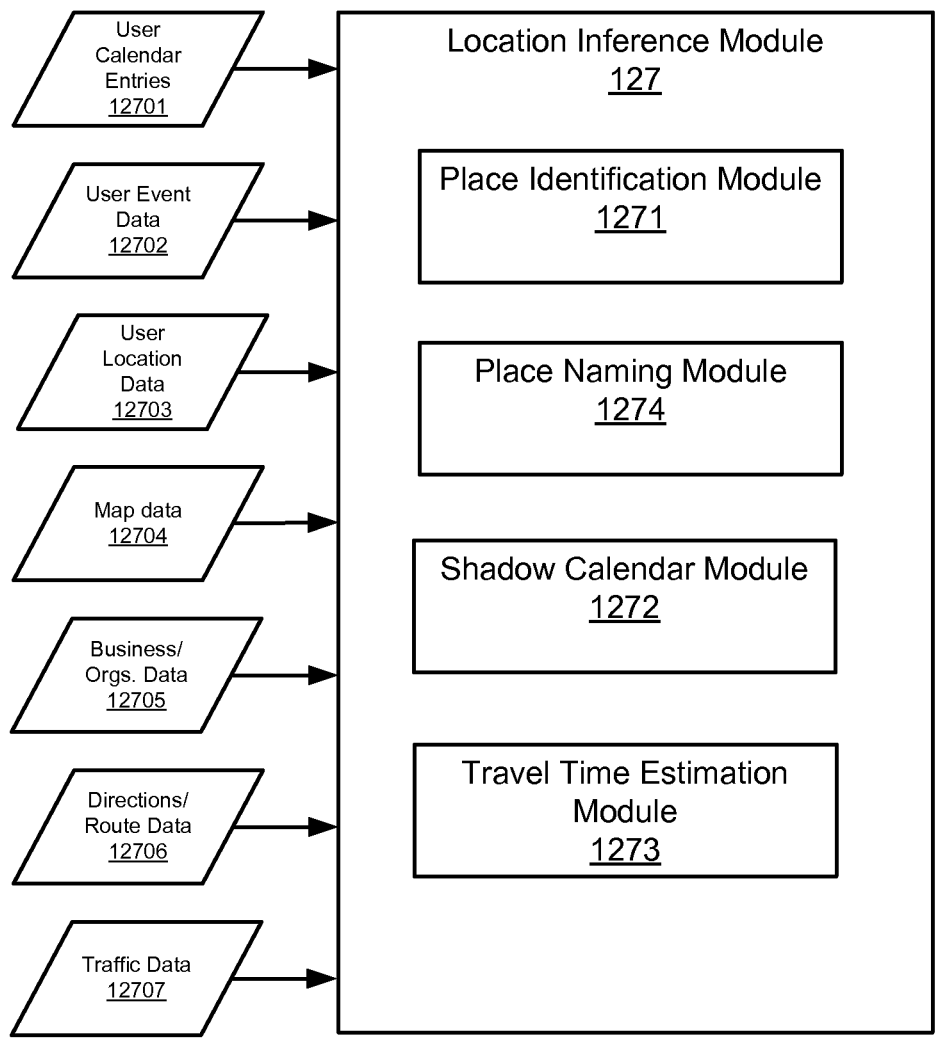
FIG. 2B is a block diagram of a location inference module, in accordance with one embodiment of the invention.

FIG. 2B is a block diagram of a location inference module 127, in accordance with one embodiment of the invention. The location inference module 127 infers the user's future location based on prior patterns, the user's calendared events, and the user's correspondence. The location inference module 127 includes a place identification module 1271, a place naming module 1274, a shadow calendar module 1272 and a travel time estimation module 1273.

The place identification module 1271 identifies places of importance in the user's saved location data. A place of importance is anywhere the user stops for a while or spends a significant amount of time. In one embodiment, a place is defined as a map point (for example, expressed in latitude/longitude coordinates), a distribution around that point (for example, a circle of fixed radius or a normal distribution with a certain standard deviation), and, optionally, one or more names. In one embodiment, a place is created for anywhere the user stops for at least 30 minutes, and places are discovered by clustering recorded location points to find these places. Places may be initially unnamed, until processed by the place naming module 1274. Places may have an associated history which tracks the when, how often, and for how long the user has visited the place; places with longer histories may be made more prominent in the user interface. Addresses discovered in the user's data may also be considered to be places; the address can generally be converted to map coordinates.

The place naming module 1274 correlates places identified by the place identification module 1271 with place names from the user, place names from the user's data, publicly-available business and place names, and other sources in user calendar entries 12701 and user event data 12702 extracted by the event recognition module 126 of the server 120, and by coordinates or other user location data 12703 received by the location tracker 123 of the server 120. The place naming module 1274 tracks possible names for identified places. A single place may have multiple valid names (such as "The White House" and "The President's house"); in addition multiple places with different names may appear as the same location due to the limitations of the device's location technology.

The place naming module 1274 can associate names with places in various ways. The user may choose to associate a name with an address or map location; in one embodiment, the user may be prompted to name places with extensive history. The user may also choose to add both a place name and an address or map location (as indicated via a map browsing application) to a calendar event; this creates an implicit association. An association may also be created when the user has a calendar event that lists a location name and his location log shows him to be at certain map coordinates during that time. Similarly, the user's correspondence may refer to an event that corresponds to a particular place and time found in the user's location log. Finally, associations may also be generated by using publicly-available location data to find possible names. All of these examples provide evidence of a location-name association; the place naming module maintains a "confidence" in every association by combining and weighing the available evidence. Places and names may be shown to the user only when the confidence reaches a threshold.

The shadow calendar module 1272 uses patterns in the user location data 12703 to create a typical routine generally followed by the user. In some cases, places with special meaning to a user, such as "work" and "home" can be inferred from patterns in the user's locations. For example, John lives in West Seattle and works downtown. The shadow calendar module 1272 has observed that he is typically in one location at night and the other during weekdays. Thus, the shadow calendar module 1272 may associate the names "home" and "work" with these places, and create a typical schedule for the user being at "home" and at "work." The typical schedule of where the user is throughout the day, week, month, or other time period is referred to herein as the user's "shadow calendar." By observing the user's typical locations, the shadow calendar module 1272 can infer where the user is likely to be in the future according to the same pattern, unless another event from the user calendar entries 12701 or user event data 12702 is scheduled to alter the pattern. Thus, events scheduled by the user can supersede events in the shadow calendar.

In one embodiment, the shadow calendar module 1272 creates "patterns" that consist of a place, a time span, a recurrence, and a probability. A place refers to any place identified and named by modules 1271 and 1274. A time span might be a range of times, with a distribution representing variance around the endpoints. Typical recurrences include daily, weekly, every weekday, and the like. Finally, the probability represents the percentage of the time the user has been observed to be in that place during those time spans (and thus a projected future probability of finding him there). For example, John's "work" pattern would consists of the place that has been identified as "work", the time span 9:00 am-5:00 pm with a normal distribution to represent that he sometimes arrives or leaves earlier or later, the recurrence "every weekday", and the probability 0.67 because John is often out of the office for meetings—about one third of the time.

The travel time estimation module 1273 estimates the travel time needed to travel to and from a calendared event. The travel time to the event can be estimated from where the user currently is, for example as reported through the user location data 12703, from a departure point that the user explicitly adds to the event data, or from where the user is predicted to be in advance of the calendared event based on the user calendar entries 12701, user event data 12702 or the shadow calendar created by the shadow calendar module 1272. Similarly, the travel time needed after the event can be estimated based on the location of the next calendared event based on the user calendar entries 12701 and the user event data 12702, or to where the user is predicted to be heading based on the shadow calendar created by the shadow calendar module 1272.

The travel time estimation module 1273 may receive map data 12704, business and organization data 12705, directions and route data 12706, traffic data 12707, and user location data 12703 as inputs to preparing travel time estimations. The map data 12704 and business and organization data 12705 can help identify the coordinates of the location for the event. For example, if the event is at Stella's Café in Seattle, the business and organization data 12705 can identify the street address for the restaurant. The map data 12704 can correlate the street address for the restaurant to a geospatial location, for example in coordinates. The directions and route data 12706 can plan the route between the user's starting location and the geospatial location of Stella's Café. The directions and route data 12706 may include directions and routes for multiple modes of transportation, such as walking, cycling, taking mass transit (e.g., bus, trolley, train, ferry), or driving. Traffic data can be used to estimate which route among several possibilities (e.g., surface streets versus a freeway, or a train versus driving) is the fastest to Stella's Café, and ultimately how long the travel time is expected to be. Lastly, observed travel time from any of the user's previous visits to this location, particularly at the same departure time, can influence the travel time estimate. In one embodiment, the system uses the user location data 12703 to compute and record the travel time for every route the user travels. When a future meeting calls for a route the user has traveled before, the travel time may be estimated as the average travel time of all previous trips along that route. The average may be computed as a weighted average, where the closer the trip was in time of day to the planned trip, the greater weight that trip has in determining the projected time. For example, suppose the user is planning a meeting at Stella's Café for noon on the next day. He may have traveled to there from work five times previously, three times at around noon and twice at 6:00 pm.

When predicting the travel time, the system may weight the travel time of the three noon trips more than that of the two evening trips. The travel time estimates can be presented to the user as blocks of time immediately adjacent to the calendared appointments, as will be shown and described with reference to FIGS. 4-7 below. These estimates can be dynamically updated, for example, in response to changing traffic conditions, and the corresponding length of the blocks of time adjacent to the calendared appointments are updated accordingly.

Figure 3:
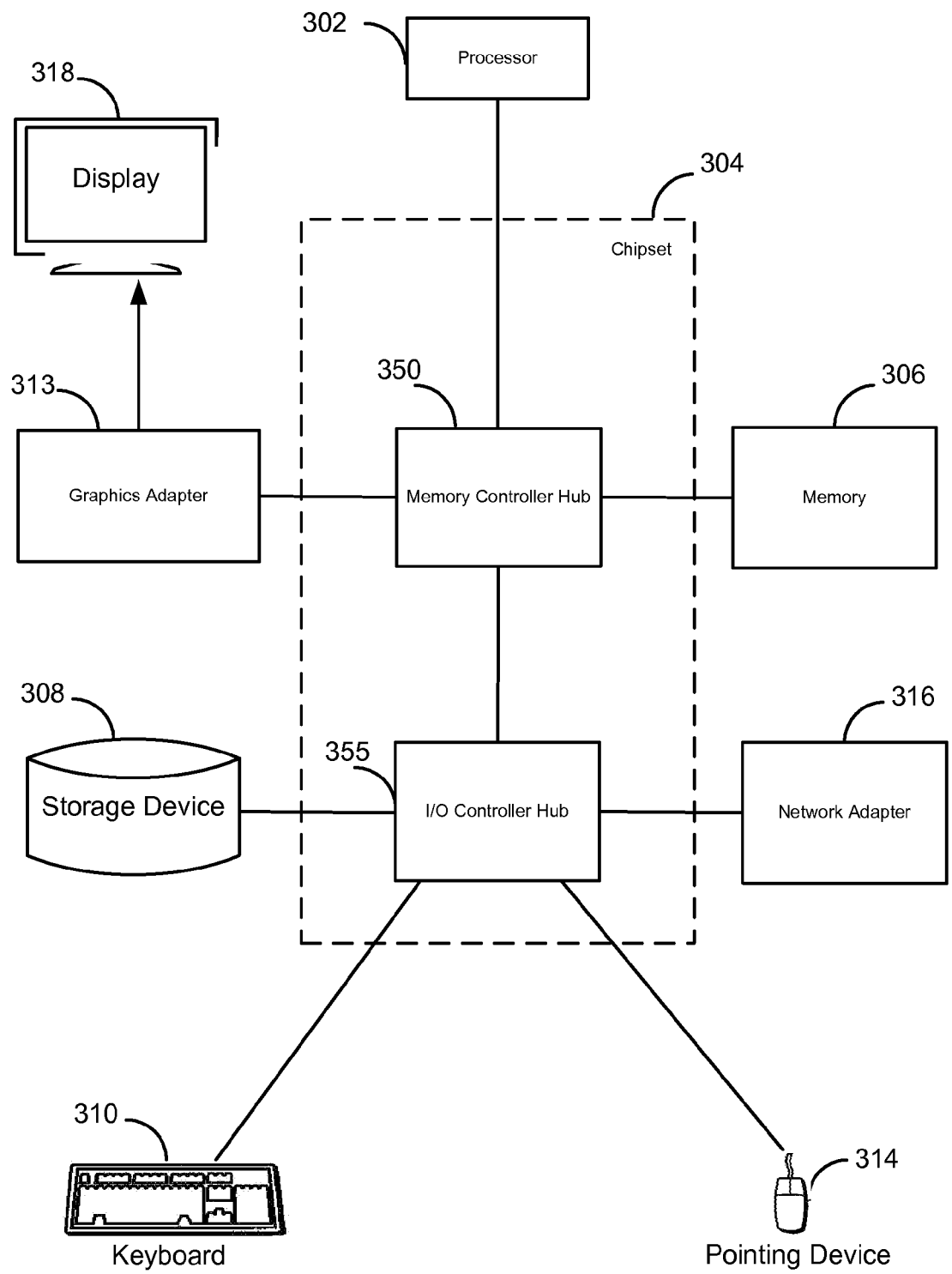
FIG. 3 is a high-level block diagram illustrating an example of a computer for use as a user device or server, in accordance with an embodiment of the invention.

FIG. 3 is high-level block diagram illustrating an example of a computer 300 for use as a server 120 or user device 110, in accordance with an embodiment of the invention. Illustrated are at least one processor 302 coupled to a chipset 304. The chipset 304 includes a memory controller hub 350 and an input/output (I/O) controller hub 355. A memory 306 and a graphics adapter 313 are coupled to the memory controller hub 350, and a display device 318 is coupled to the graphics adapter 313. A storage device 308, keyboard 310, pointing device 314, and network adapter 316 are coupled to the I/O controller hub 355. Other embodiments of the computer 300 have different architectures. For example, the memory 306 is directly coupled to the processor 302 in some embodiments.

The storage device 308 is a computer-readable storage medium such as a hard drive, compact disk read-only memory (CD-ROM), DVD, or a solid-state memory device. The memory 306 holds instructions and data used by the processor 302. The pointing device 314 is a mouse, track ball, or other type of pointing device, and is used in combination with the keyboard 310 to input data into the computer system 300. The graphics adapter 313 displays images and other information on the display device 318. In some embodiments, the display device 318 includes a touch screen capability for receiving user input and selections. The network adapter 316 couples the computer system 300 to the communications network 101. Some embodiments of the computer 300 have different and/or other components than those shown in FIG. 3.

The computer 300 is adapted to execute computer program modules for providing functionality described herein. As used herein, the term "module" refers to computer program instructions and other logic used to provide the specified functionality. Thus, a module can be implemented in hardware, firmware, and/or software. In one embodiment, program modules formed of executable computer program instructions are stored on the storage device 308, loaded into the memory 306, and executed by the processor 302.

The types of computers 300 used by the entities of FIG. 1 can vary depending upon the embodiment and the processing power used by the entity. For example, a mobile device 110 that is PDA typically has limited processing power, a small display 318, and might lack a pointing device 314. The server 120, in contrast, may comprise multiple blade servers working together to provide the functionality described herein.

Figure 4:
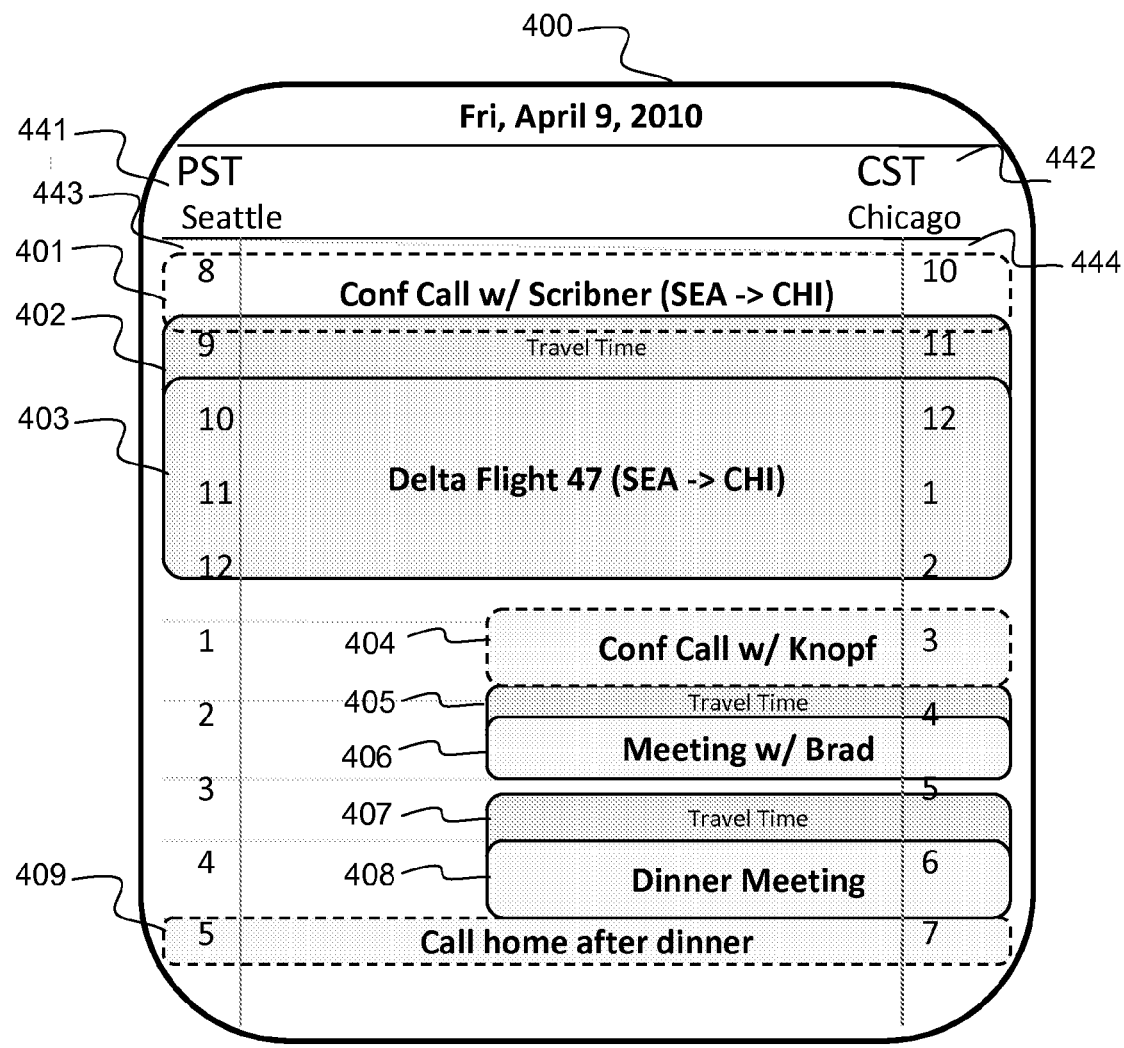
FIG. 4 is an illustration of a user interface displaying a calendar showing events in two locations in different time zones, in accordance with an embodiment of the invention.

FIG. 4 is an illustration of a user interface 400 displaying a calendar showing events in two locations in different time zones. The user interface 400 allows the user to view a visual representation of calendar entries according to the location in which the events represented by the calendar entries occur and the local time at which they occur. The user interface 400 is divided into two portions: the portion on the left 441 corresponding to Pacific Standard Time, and the portion on the right 442 corresponding to Central Standard Time. In the example, these time zones have been chosen because the user is currently in Seattle, in the Pacific time zone, and will be traveling to Chicago, in the Central time zone. The user may manually select these time zones, or allow the device to select them automatically, based on the locations of calendar events during the day being viewed.

A timeline 443 corresponding to Pacific Standard Time is placed vertically within the portion on the left 441, and a timeline 444 corresponding to Central Standard Time is placed vertically within the portion on the right 442. Each timeline 443, 444 displays numbers corresponding to times in the respective time zone. Calendared events are shown as enclosed shapes that overlap one or more of the timelines 443, 444 associated with the different locations. In this embodiment, the position of events on the left or the right portion of the screen provides a visual identifier to the user regarding which timeline the event is associated with, and thus, which timeline the event originated from or is connected to. In this example, the shape of events is rectangular with rounded corners, but any other shape may be used additionally or alternatively. The start and end times for an event are represented respectively by where the top edge and bottom edge of the shape crosses the timeline 443, 444. Thus, the vertical extent of the shape is correlated to the length of the event. The horizontal placement and extent of the shape represents the location or locations which is relevant to the event, as will be described in more detail below. In addition, each shape may contain a text description of the event to identify the event to the user. Each event may be associated with additional information that may or may not be displayed to the user, including other participants in the event, the location of the event, the exact start time and end time of the event, the organizer of the event, and/or any other information that is generally tracked with respect to calendar entries, as known to those of ordinary skill in the art.

The first calendared appointment for the user on Friday, Apr. 9, 2010 is a conference call 401 between Seattle and Chicago. The user interface 400 allows the user to quickly grasp what time it is in Seattle and Chicago for any calendar entry by viewing the timelines 443, 444 down the left 441 and right 442 sides of the display. In one embodiment, events that do not have to take place in any specific location are identified in a different color or otherwise distinguished from events that are tied to specific locations. In the example shown in FIG. 4, events that do not have to take place in any specific location, for example calls 401, 404, and 409, are surrounded by a "time box" having dotted lines. The dotted lines overlap the timelines relevant for the people participating in the event (i.e., the call participants) but do not require the participants to be at any particular location. Thus, when the user has the conference call 401, the user is calling from Seattle to Chicago, so the event 401 overlaps both timelines 443 and 444, despite the fact that the user could be anywhere in Seattle or even en route to another city while making the call. Again, the position of the event "time box" relays important information regarding timelines to the user: especially which timelines are relevant to that event. Because the user may participate in these events while en route, they may be scheduled to overlap with travel time without a conflict; in one embodiment, the user is warned of the overlap and may choose whether to schedule the event. For example, the user may choose to make the conference call 401 while en route to the airport for his flight.

After the call 401, the user has a flight 403 scheduled from Seattle to Chicago. The flight event 403 is represented as an enclosed shape outlining an area that spans the timelines 443, 444 associated with both Seattle and Chicago because the flight takes off in one location and lands in the other, and is thus relevant to both timelines. The travel time to get to the airport for the flight event 403 is shown by calendar entry 402 adjacent to the upper edge of the flight event 403. In this embodiment, the user can quickly view the duration of the flight by the vertical extent of the shape 403 and quickly grasp the total time the user will be in transit from the combination of the travel time 402 and flight event 403. Optionally, the travel time 402 may be displayed as spanning the entire width of the associated calendar entry 403 to emphasize that the travel time 402 is closely tied to the event represented by the calendar entry 403. Alternatively, the travel time 402 may be displayed as overlapping just one timeline 443 and positioned on one side of the display 441, for example as spanning the left half of the flight event 403 in order to emphasize that the travel represented by the travel time 402 is associated with one location, namely Seattle. The user can also quickly ascertain what the local time will be in Chicago when the flight will arrive by referencing where the bottom edge of shape 402 crosses the Chicago timeline 444.

In contrast to travel events such as flight 403, events that occur in just one location are shown as enclosed shapes having horizontal extents and placements to overlap just the timeline for that one location. For example, the user can quickly grasp that the meeting with Brad 406 occurs in Chicago rather than Seattle, as evidenced by the fact that the calendar entry 406 is an enclosed shape placed on the right side 442 of the display and overlaps the timeline 444 for Chicago.

Also shown in FIG. 4 are two meetings 406 and 408 that include travel time estimates 405 and 407 that allocate time in the calendar to travel to the meetings. In this example, the travel times appear as shapes that connect to a top or bottom edge of another calendared event. The travel times 402, 405 and 407 can be estimated by the travel time estimation module 1273 of the server 120 with reference to map data 12704, business and organization data 12705, directions and route data 12706, traffic data 12707, and user location data 12703 as inputs to preparing travel time estimations. In one embodiment, the travel time estimation module 1273 automatically places these travel times 402, 405 and 407 into the calendar so that they appear as scheduled events to prevent the user from double-booking the time before the meeting/event. The travel times 402, 405 and 407 also assist the user in planning when the user needs to leave a previous engagement in order to arrive at the next scheduled meeting/event on time.

Figure 5:
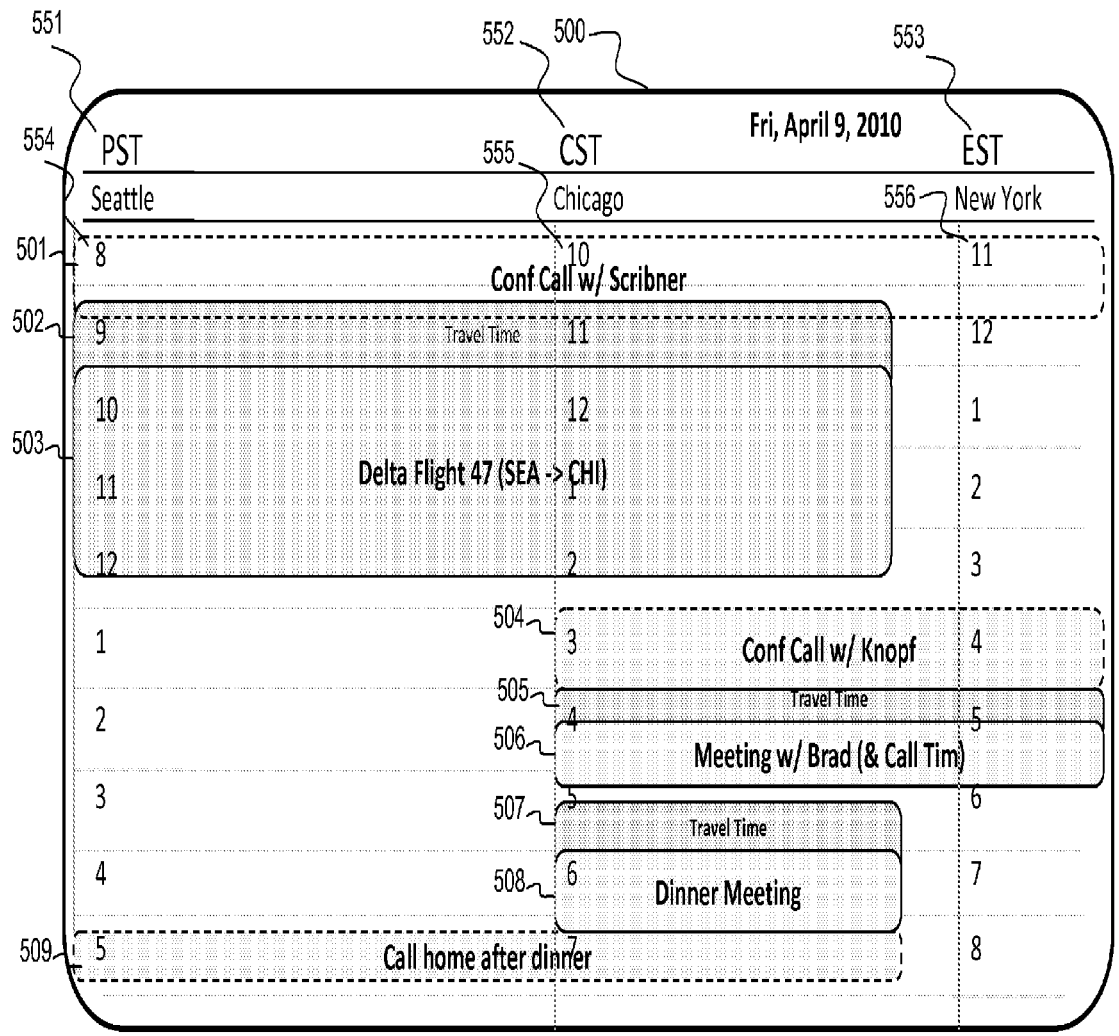
FIG. 5 is an illustration of a user interface displaying a calendar showing events in three locations in three different time zones, in accordance with an embodiment of the invention.

FIG. 5 is an illustration of an alternate user interface 500 displaying a calendar showing events in three locations in three different time zones. In other embodiments, more or fewer time zones and locations can be displayed which allows the user great flexibility in how the user views calendar entries arranged by location and time. In this embodiment, the user interface 500 is divided into three portions: the portion on the left 551 corresponding to Pacific Standard Time, the portion in the middle 552 corresponding to Central Standard Time, and the portion on the right 553 corresponding to Eastern Standard Time. The on-screen location of the "time box" that represents the event provides a visual cue to the user of what timeline or timelines are relevant to the event in question. In this embodiment, these time zones have been chosen because the user is currently in Seattle, in the Pacific time zone, will be traveling to Chicago, in the Central time zone, and also has two meetings that include calls to people in New York, the Eastern time zone. A specific city or other location within each of the time zones may or may not be labeled in the portions 551, 552, 553 of the user interface 500. Each of the three portions includes a respective timeline 554, 555, 556 that shows the local time for the location corresponding to the respective portion 551, 552, 553. In some implementations, the locations and time zones are represented in the order in which they appear on a map as a default organization, but in other implementations they are presented in an order determined by user preference.

Included in this example are a calendar entry 501 for a conference call with participants from all three time zones; calls 504 and 509 with participants from two time zones each; a flight event 503 that begins in one location (Seattle) and ends in another (Chicago) and requires travel time 502, and two meeting events 506, 508 that each require travel time 505, 507 to attend. Note that in this example, meeting 506 with Brad in Chicago includes a call to Tim in New York, hence the calendar entry 506 overlaps the timelines for Chicago 555 and New York 556.

Figure 6:
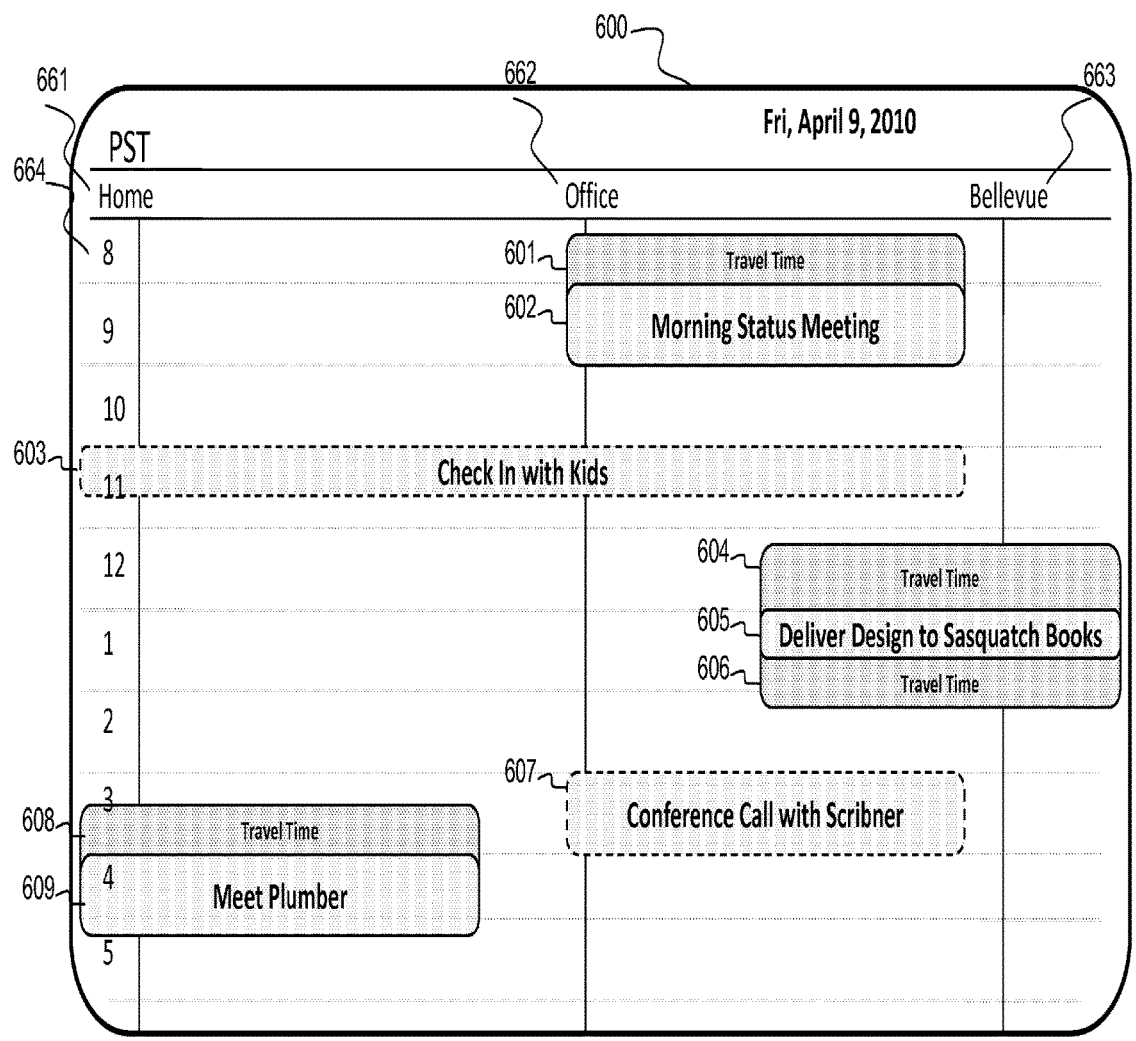
FIG. 6 is an illustration of a user interface displaying a calendar showing events in three locations within the same time zone, in accordance with an embodiment of the invention.

FIG. 6 is an illustration of a user interface 600 displaying a calendar showing events in three locations within the same time zone. The user interface 600 allows the user to view a visual representation of calendar entries according to the location in which the events represented by those calendar entries occur. The timeline 664 for the Pacific Standard Time that applies to all the locations in this example is shown along the left of the interface 600, but user interface 600 is still divided into three parts: the left side 661 represents the location of the user's home, the middle 662 represents the location of the user's office, and the right side 663 represents Bellevue, a location to which the user must travel.

The user begins the day at home. In order to attend the morning status meeting 602 at the office, an estimated travel time 601 has been inserted into the calendar to account for the travel time from the user's home to the office.

According to the calendar shown in FIG. 6, the user plans to call 603 to "Check In with Kids" at 11. Again in this example, dotted lines surround appointments that do not need to occur at any particular location. In one embodiment, the calendar events that do not need to occur at any particular location are placed so as to overlap the location that the location inference module 127 predicts that the user will be based on the user's patterns. In this example, the conference call 607 overlaps the office location 662 because the user is generally in the office on Friday afternoons according to the shadow calendar developed by the shadow calendar module 1272 of the location inference module 127.

Travel time 604 is an estimate of the time needed for the user to travel to the delivery location of Sasquatch Books corresponding to event 605 in Bellevue from the user's office. Travel time 606 is an estimate of the time needed for the user to travel from the delivery location of Sasquatch Books corresponding to event 605 in Bellevue back to the user's office. Although the user may not have explicitly indicated that the user would be traveling back to the office, the location inference module 127 predicts that the user will return to the office based on the user's past patterns according to the shadow calendar developed by the shadow calendar module 1272 of the location inference module 127. The location inference module 127 also predicts that the user will be traveling home to meet the plumber 609 from the office based on the shadow calendar. Thus, travel time 608 is an estimate of the time needed for the user to travel home from the office. Travel time 608 is shown overlapping with conference call 607; however, because the conference call could be made during travel (as indicated by the dotted border around the conference call 607), the user need not consider this a conflict. On the other hand, if the user is planning on driving home and prefers to not drive while on the phone, the overlap suggests that he should reschedule either the conference call 607 or the plumber visit 609.

Figure 7:
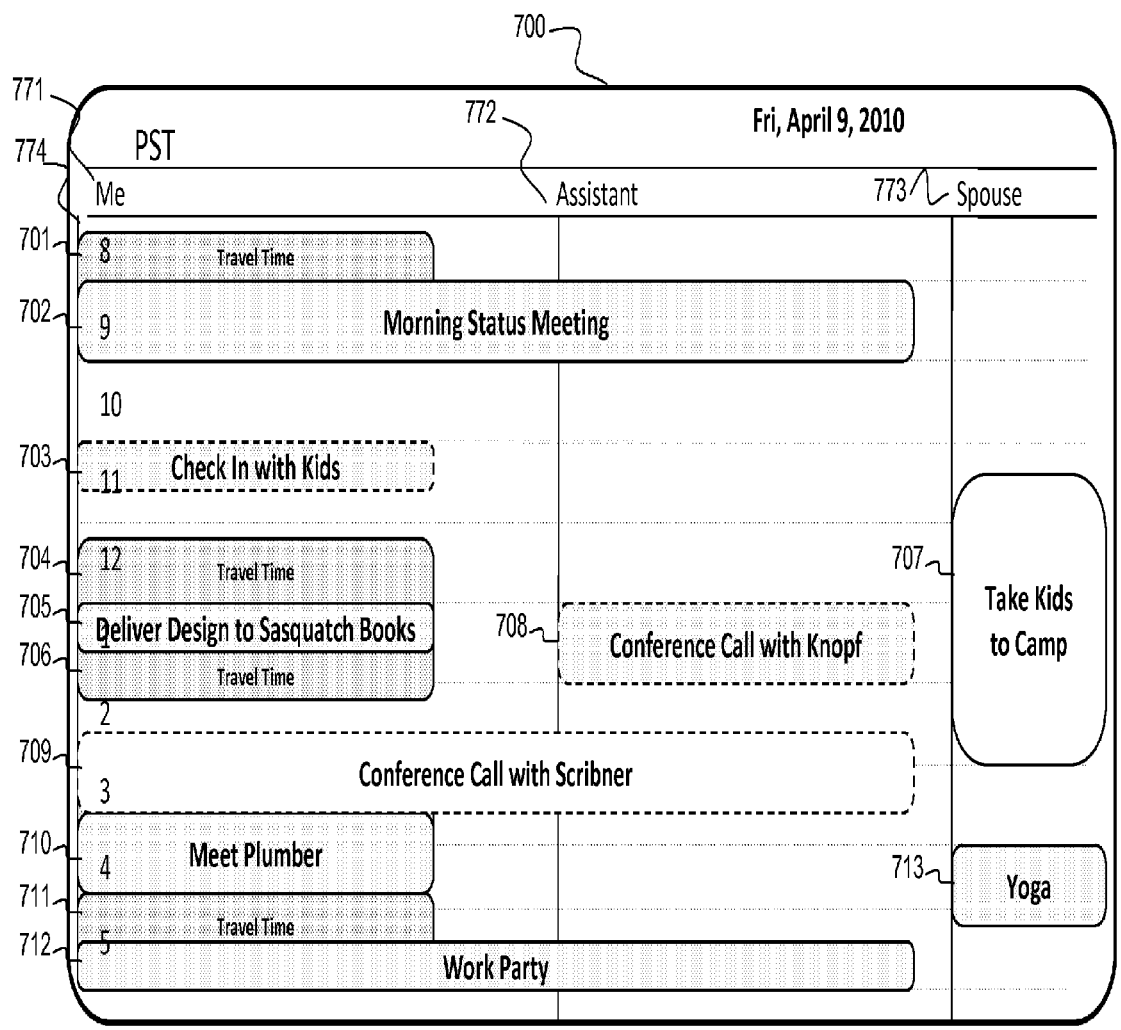
FIG. 7 is an illustration of a user interface displaying a calendar showing events for three users, wherein some events are shared events between multiple users, in accordance with an embodiment of the invention.

FIG. 7 is an illustration of a user interface 700 displaying a calendar showing events for three users, wherein some events are shared events between multiple users, in accordance with an embodiment of the invention. Whereas the examples shown in FIG. 4-6 illustrate user interface divided into portions representing locations, the portions of the user interface 700 of FIG. 7 represent different people. Collectively, locations and people will be referred to herein as "calendar entities." The user interface 700 allows the user to view a visual representation of calendar entries according to who is involved in the event represented by those calendar entries. The timeline 774 for the Pacific Standard Time that applies to the user and the user's assistant and spouse is displayed along the left of the interface 700, but the user interface 700 is divided into three parts: the left side 771 represents the user's own calendar, the middle 772 represents the user's assistant's calendar, and the right side 773 represents the user's spouse's calendar. Note that in this example, travel times 701, 704, 706, and 711 are presented only on the user's calendar for the user's calendared events. Note also that only events that involve the user overlap the timeline 771. The events on the calendars of the assistant 772 and the spouse 773 are placed at the vertical position on the screen that corresponds to the scheduled time for the event and the horizontal position on the screen corresponding to the entity/person involved in the event.

The user interface 700 includes examples of events 702, 709 and 712 that involve the user and the user's assistant. In a single glance, the user can grasp where the user and the user's assistant's schedules overlap and when the user's assistant is committed to other responsibilities, like conference call 708. Likewise, the multiple user view of user interface 700 allows the user to see how the user's schedule lines up the schedules of others in his life. For example, the user has calendared a call 703 to check in with the kids before the user's spouse takes the kids to camp 707, and the user must be home to meet the plumber 710 because the user's spouse will be at yoga 713.

Figure 8:
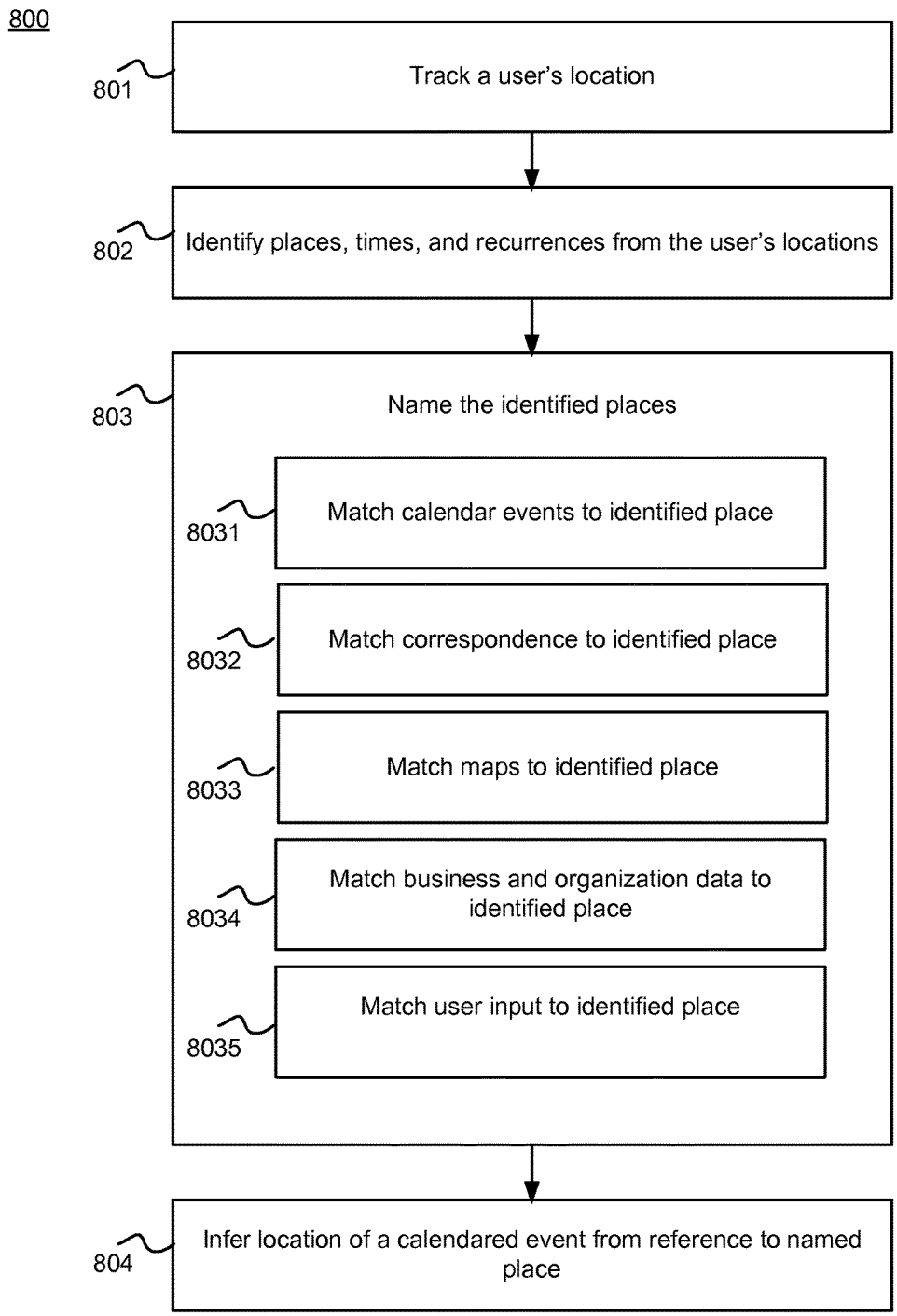
FIG. 8 is a flow chart illustrating a method of inferring a location of a calendar event, in accordance with an embodiment of the invention.

FIG. 8 is a flow chart illustrating a method of inferring a geographic location of a calendar event, in accordance with an embodiment of the invention. In step 801, the user's location is tracked. For example, the location determination module 115 of the user device 110 determines the location of the user device and communicates the location information to the location tracker 123 of the server 120.

In step 802, places, times, and recurrences are identified from the user's tracked locations, for example by the place identification module 1271 of the location inference module 127. Generally, as a user spends time in an area, several location readings are communicated from the location determination module 115 of the user device 110 to the location tracker 123 of the server. These location readings are grouped, for example, by identifying a central location of a plurality of similar locations readings and a reasonable variance threshold for readings to be considered to be from the same location. Over time, patterns of recurrences develop in the times that a user is reported as being at various locations. These observed patterns become the basis for the shadow calendar module 1272 of the location inference module 127 to develop the shadow calendar. For example, the user may generally be tracked around one set of coordinates overnight, and another set of coordinates during weekdays from 9-5, and yet at another set of coordinates on Saturday nights. Locations where the user repeatedly goes are inferred to have significance to the user, and it is these locations that it is desirable to name as places, so that when future plans call for visiting these places, they can be referred to by the place name and the travel times to and from the places can be calculated.

In step 803, the identified places are named, for example by the place naming module 1274 of the location inference module 127. Several techniques are used to match what has been observed from the user's patterns with name of locations that have meaning to the user. These techniques will now be described:

Calendar events are matched 8031 to the identified places based on the time at which the calendared event was scheduled to occur and the observed location of the user at that time. For example, the user enters a meeting on Tuesday with a client into his calendar with the location of "Bob's Office." Upon attending the Tuesday meeting, the location inference module 127 observes that the user spends about an hour at a new location, and tentatively associates the name "Bob's Office" with the new location. Thus, the following week, when the user creates another weekday meeting having the location of "Bob's Office," the user interface may display a pin on a map corresponding to the inferred location, and based on the observation that the user is generally at work during weekdays, the travel time estimation module 1273 can estimate a travel time from the user's work to Bob's Office. Thus, when the user saves the calendar entry for the new meeting at Bob's Office, the travel time is also automatically scheduled.

Correspondence is matched 8032 to an identified place based on recognized event data from the analysis that the event recognition module 126 performs on the user's correspondence. For example, if a user has received an email that states "Meet me at Sarah's house tonight at 7" the event recognition module 126 would recognize that this email refers to an event and that the event takes place at a location called "Sarah's House" (as indicated by "at"), starts at 7:00 pm on the current day ("tonight" indicates both the current day and in the evening), and includes the sender ("me"). Based on this information, the location inference module 127 infers that wherever the user happens to be at 7:00 pm might be the place known as "Sarah's House" (of course, it might not, if the user ignores the email). Accordingly, when the location inference module 127 observes that the user spends around half an hour at a new location at 7:00 that evening, will tentatively associate the name "Sarah's house" with the new location.

Another technique for matching a location visited by the user with a name that has meaning to the user that can be used alternatively or additionally to the techniques described above is matching 8033 labeled map data to the identified place. For example, if the user location data 12703 indicates to the location inference module 127 that the user has spent time at a set of coordinates, map data 12704 that corresponds to those coordinates can be consulted to determine a name associated with those coordinates, such as the labeled name of the neighborhood, the park, the lake, the trail, etc. Because location information can have a certain amount of error, because there may be multiple names at or near a set of coordinates, and because we cannot assume that a set of map data is complete, associations created this way cannot be certain but are assigned a confidence value depending on the closeness of the match and degree of certainty. For example, a location in the center of a large neighborhood results in higher confidence than a location near a small park, due to the greater likelihood that the user was not at the park at all.

Data about local businesses 8034 can also be matched to the identified place. Data about local businesses from business and organizational data 12705 can be used in combination with other types of data in determining which place from a few possible places that the user spent time. For example, the location determination module 115 of John's user device 110 reports locations to the location tracker 123 that John is out of the office from 12:00-1:00 at a map location that has not been reported before. Data about local businesses shows three businesses within the error radius of the location readings: a bookstore called "Book Barn," a restaurant called "Taco Palace," and a restaurant called "Burger Heaven." Based on the fact that John was gone during lunchtime, the location inference module 127 has been programmed to infer that it is more likely that he is visiting a restaurant than a bookstore. John had also received an email from Mary that morning that said "lunch today at Burger Heaven?" Therefore, the location inference module 127 concludes that John went to Burger Heaven with Mary between 12:00-1:00. "Burger Heaven" becomes a known named place, and the next time John's user device 110 reports the locations that could correspond to any of the three businesses, the location inference module 127 will be more likely to infer that John visited Burger Heaven than Taco Palace. As with map data, matches based on business data can rarely be certain and will result in associated confidence values depending on the closeness of the match and corroborating evidence as in the example.

Referring back to FIG. 8, alternatively or additionally, user input is matched 8035 to the identified place in order to name the place. In one implementation, a user's explicit entry of a name for location will override any names assigned through inference techniques. In some implementations, the location inference module 127 will prompt the user to confirm the identified place name is correct, but in others, a high-confidence identified place name is assumed to be correct unless and until the user edits it.

In step 804, the location of a calendared event can be inferred from a reference to a named place. Once places the user goes have been appropriately associated with names that are used to refer to those places, the location inference module 127 can infer the location of an event from the name, and the travel time estimation module 1273 can calculate the time needed to travel to the location. To continue the previous example, if John sends his buddy Ted a lunch invite and he enters "Burger Heaven" for the meeting location, the GUI 111 can display an indication to John that the location can be mapped and show the now-known location of Burger Heaven on a map. Furthermore, the location inference module 127 will infer that John will be going to Burger Heaven from work (since he is usually at work during the day according to the shadow calendar), and provides an estimated 10-minute travel time based on map data 1204, traffic data 12707, and John's past trips to Burger Heaven. Thus, as the number of named places that the user has been is built up over time, the location inference module's 127 ability to determine the location of a place referred to in a future calendar entry is improved, and the travel time estimation module 1273 can estimate travel times to and/or from the place referred to in that calendar entry without additional input from the user.

The present invention has been described in particular detail with respect to several possible embodiments. Those of skill in the art will appreciate that the invention may be practiced in other embodiments. The particular naming of the components, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer and run by a computer processor. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

In addition, the present invention is not described with reference to any particular programming language. It is appreciated that a variety of programming languages may be used to implement the teachings of the present invention as described herein, and any references to specific languages are provided for enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

The invention claimed is:

1. A computer-implemented method of adding names of locations to an electronic map, the method comprising:
    analyzing location data for a user to identify a visit by the user to an unnamed location at a first time, the unnamed location not having a name assigned to it on the electronic map;
    accessing a message store having records of messages previously exchanged between the user and other people;
    identifying, in a message in the message store exchanged between the user and a second person, a place name and a second time corresponding to the place name;
    identifying, in a calendar associated with the user, a calendar event including the place name and a time range;
    modifying a confidence level of an association between the unnamed location and the place name based on the first and second times and the time range; and
    adding the place name to the unnamed location on the electronic map responsive to the confidence level equaling or exceeding a confidence threshold, thereby producing a named location.

2. The method of claim 1, further comprising modifying the confidence level of the association between the unnamed location and the place name based on map data indicating a correlation between the unnamed location and an address associated with the place name.

3. The method of claim 2, wherein the address associated with the place name is identified from organization data.

4. The method of claim 1, further comprising replacing the place name with another place name entered by the user.

5. A non-transitory computer-readable storage medium storing executable computer program instructions for adding names of locations to an electronic map, the computer program instructions comprising instructions for:
    analyzing location data for a user to identify a visit by the user to an unnamed location at a first time, the unnamed location not having a name assigned to it on the electronic map;
    accessing a message store having records of messages previously exchanged between the user and other people;
    identifying, in a message in the message store exchanged between the user and a second person, a place name and a second time corresponding to the place name;
    identifying, in a calendar associated with the user, a calendar event including the place name and a time range;
    modifying a confidence level of an association between the unnamed location and the place name based on the first and second times and the time range; and
    adding the place name to the unnamed location on the electronic map responsive to the confidence level equaling or exceeding a confidence threshold, thereby producing a named location.

6. The computer-readable storage medium of claim 5, wherein the instructions further comprise instructions for modifying the confidence level of the association between the unnamed location and the place name based on map data indicating a correlation between the unnamed location and an address associated with the place name.

7. The computer-readable storage medium of claim 6, wherein the address associated with the place name is identified from organization data.

8. The computer-readable storage medium of claim 5, wherein the instructions further comprise instructions for replacing the place name with another place name entered by the user.

9. A system for estimating travel time to a calendared event, the system comprising:
    a non-transitory computer-readable storage medium storing executable computer program modules executable to perform steps comprising:
        adding names of locations to an electronic map by:
            identifying a visit by a user to an unnamed location at a first time, the unnamed location not having a name assigned to it on the electronic map;
            accessing a message store having records of messages previously exchanged between the user and other people;
            identifying, in a message in the message store exchanged between the user and a second person, a place name and a second time corresponding to the place name;
            identifying, in a calendar associated with the user, a calendar event including the place name and a time range;
            modifying a confidence level of an association between the unnamed location and the place name based on the first and second times and the time range; and
            adding the place name to the unnamed location on the electronic map responsive to the confidence level equaling or exceeding a confidence threshold, thereby producing a named location;
        estimating a travel time to a calendared event at the named location from a location of the user at a time prior to the calendared event; and
        displaying the calendar to the user, the calendar including a representation of the calendared event and a representation of the estimated travel time; and
    a processor for executing the computer program modules.

10. The method of claim 1, further comprising:
    receiving a calendar entry after producing the named location, the calendar entry specifying an event for the user and indicating an event time and the named location;
    determining a likely location for the user at a time prior to the event time;
    estimating a travel time to the named location from the likely location; and
    displaying a representation of the estimated travel time to the user.

11. The computer-readable storage medium of claim 5, wherein the instructions further comprise instructions for:
    receiving a calendar entry after producing the named location, the calendar entry specifying an event for the user and indicating an event time and the named location;
    determining a likely location for the user at a time prior to the event time;
    estimating a travel time to the named location from the likely location; and displaying a representation of the estimated travel time to the user.

12. The method of claim 1, wherein identifying the place name and the second time corresponding to the place name comprises:
   identifying, in the message a general time range; and
   determining the second time from the general time range and the calendar event.

13. The computer-readable storage medium of claim 5, wherein identifying the place name and the second time corresponding to the place name comprises:
   identifying, in the message a general time range; and
   determining the second time from the general time range and the calendar event.

14. The method of claim 1, wherein a prominence of the named location on the user's electronic map is based on a combination of a number of user visits to the named location and a frequency of user visits to the named location.

15. The computer-readable storage medium of claim 5, wherein a prominence of the named location on the user's electronic map is based on a combination of a number of user visits to the named location and a frequency of user visits to the named location.

16. The method of claim 1, wherein the place name is added to the unnamed location on the electronic map automatically if the confidence level equals or exceeds the confidence threshold.

17. The method of claim 10, wherein displaying the representation of the estimated travel time to the user comprises displaying a travel time calendar entry adjacent to the calendared event entry, a width of the travel time calendar entry along a calendar timeline corresponding to the estimated travel time.

18. The method of claim 10, wherein determining the likely location comprises:
   determining a routine place and a routine time span from a recurring pattern in the user's location data; and
   determining that the likely location of user is the routine place in response to the time prior to the event time falling within the routine time span.

19. The computer-readable storage medium of claim 11, wherein the instructions for displaying the representation of the estimated travel time to the user comprise instructions for displaying a travel time calendar entry adjacent to the calendared event entry, a width of the travel time calendar entry along a calendar timeline corresponding to the estimated travel time.

20. The computer-readable storage medium of claim 11, wherein the instructions for determining the likely location comprises:
   determining a routine place and a routine time span from a recurring pattern in the user's location data; and
   determining that the likely location of user is the routine place in response to the time prior to the event time falling within the routine time span.

* * * * *